(12) United States Patent
Noh et al.

(10) Patent No.: US 7,979,419 B2
(45) Date of Patent: Jul. 12, 2011

(54) DISTRIBUTED SEARCH METHODS FOR TIME-SHIFTED AND LIVE PEER-TO-PEER VIDEO STREAMING

(75) Inventors: Jeonghun Noh, Stanford, CA (US); Sachin G. Deshpande, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 922 days.

(21) Appl. No.: 11/933,723

(22) Filed: Nov. 1, 2007

(65) Prior Publication Data

US 2009/0116640 A1 May 7, 2009

(51) Int. Cl.
G06F 17/30 (2006.01)
H04N 7/167 (2011.01)
G06F 15/16 (2006.01)
G06F 15/173 (2006.01)

(52) U.S. Cl. ........ 707/711; 709/217; 709/226; 709/229; 726/31; 707/758

(58) Field of Classification Search ........... 707/E17.052; 709/217, 226, 229; 726/31
See application file for complete search history.

(56) References Cited

U.S. PATENT DOCUMENTS

| | | | | |
|---|---|---|---|---|
| 5,995,623 | A * | 11/1999 | Kawano et al. | 713/189 |
| 6,363,149 | B1 * | 3/2002 | Candelore | 380/45 |
| 7,174,385 | B2 | 2/2007 | Li | |
| 2002/0162109 | A1 | 10/2002 | Shteyn | |
| 2002/0194601 | A1 | 12/2002 | Perkes et al. | |
| 2003/0126277 | A1 | 7/2003 | Son et al. | |
| 2003/0219235 | A1 | 11/2003 | Nakatani et al. | |
| 2004/0034550 | A1 | 2/2004 | Menschik et al. | |
| 2005/0108203 | A1 * | 5/2005 | Tang et al. | 707/3 |
| 2006/0050697 | A1 * | 3/2006 | Li et al. | 370/389 |
| 2006/0053209 | A1 * | 3/2006 | Li | 709/217 |
| 2006/0069798 | A1 * | 3/2006 | Li et al. | 709/231 |
| 2006/0069800 | A1 * | 3/2006 | Li | 709/232 |
| 2006/0080454 | A1 * | 4/2006 | Li | 709/231 |
| 2006/0095401 | A1 | 5/2006 | Krikorian et al. | |
| 2006/0107286 | A1 | 5/2006 | Connor et al. | |
| 2006/0190615 | A1 | 8/2006 | Panwar et al. | |
| 2006/0195914 | A1 * | 8/2006 | Schwartz et al. | 726/32 |
| 2007/0033167 | A1 * | 2/2007 | Basu et al. | 707/3 |
| 2007/0113096 | A1 * | 5/2007 | Zhu et al. | 713/180 |
| 2007/0130360 | A1 * | 6/2007 | Li | 709/231 |
| 2007/0130361 | A1 * | 6/2007 | Li | 709/231 |
| 2007/0150601 | A1 | 6/2007 | Angelica | |

(Continued)

FOREIGN PATENT DOCUMENTS

EP 1 643 716 A1 4/2006

(Continued)

OTHER PUBLICATIONS

Chi, H.;Zhang,Q;Jia,J.;& Shen,X.;"Efficient Search and Scheduling in P2P-based Media-on-Demand Streaming Service,"Jan. 2007,pp. 119-130,IEEE Journal on Selected Areas,vol. 25,No. 1.

(Continued)

Primary Examiner — Christian LaForgia
(74) Attorney, Agent, or Firm — Michael Blaine Brooks, PC; Michael B. Brooks; David Ripma

(57) ABSTRACT

Systems, devices and methods for supporting live and time-shifted video streaming via distributed search methods for registering and locating cached portions of video streams shared in peer-to-peer systems.

15 Claims, 13 Drawing Sheets

U.S. PATENT DOCUMENTS

| | | | |
|---|---|---|---|
| 2007/0192321 A1* | 8/2007 | Farr et al. ........................... | 707/9 |
| 2007/0192349 A1* | 8/2007 | Farr et al. ....................... | 707/102 |
| 2007/0195796 A1* | 8/2007 | Ushiyama et al. ............. | 370/396 |
| 2007/0250582 A1* | 10/2007 | Sidhu et al. .................... | 709/206 |
| 2007/0299820 A1* | 12/2007 | Bushmitch et al. ............... | 707/3 |
| 2008/0037527 A1* | 2/2008 | Chan et al. ..................... | 370/353 |
| 2008/0205291 A1 | 8/2008 | Li et al. | |
| 2008/0235746 A1 | 9/2008 | Peters et al. | |
| 2009/0327505 A1* | 12/2009 | Rao et al. ...................... | 709/230 |
| 2010/0218260 A1* | 8/2010 | Schwartz et al. ............... | 726/26 |

FOREIGN PATENT DOCUMENTS

| | | |
|---|---|---|
| JP | 2004-260532 | 9/2004 |
| JP | 2006-079606 | 3/2006 |
| JP | 2006-221457 | 8/2006 |
| WO | WO 02/07388 A2 | 1/2002 |

OTHER PUBLICATIONS

Guo,Y.;Suh,K.,Kurose,J.;Towsley,D.,"P2Caast:Peer-to-peer Patching Scheme for VoD Service,"May 20-24, 2003, Proceedings of the 12th World Wide Web Conference, Budapest, Hungary.

Do,T.;Hua,K.;& Tantaoui, M.,"P2VoD: Providing Fault Tolerant Video-on-Demand Streaming in Peer-to-Peer Environment,"Jun. 2004,IEEE ICC 04, Paris.

Cui, Y.; Li, B.; & Nahrstedt, K., "oStream:Asynchronous Streaming Multicast in Application-Layer Overlay Networks,"Jan. 2004, IEEE Journal on Selected Areas, vol. 22, No. 1.

Stoica,I.;Morris,R.,Karger,D.,Kaashoek,F.;& Balakrishnan, H.,"Chord:A Scalable Peer-to-peer Lookup Service for Internet Applications,"Aug. 2001,SIGCOMM'01, San Diego, CA., USA.

Castro,M.;Druschel,P.:Hu,Y.;& Rowstron,A.,"Proximity neighbor selection in tree-based structured peer-to-peer overlays,"2003, Technical Report MSR-TR-2003-52, Microsoft Corp.

Maymounkov, Petar and Mazieres, David,"Kademlia: A Peer-to-peer Information System Based on the XOR metric,"Mar. 2002, Cambridge, USA.

Baset, Salman A. and Schulzrinne, Henning G.,"An Analysis of the Skype Peer-to-Peer Internet Telephony Protocol," 2006, IEEE Infocom 2006.

Setton,E.;Noh,J.;& Girod,B.,"Congestion-Distortion Optimized Peer-To-Peer Video Streaming,"Oct. 2006, International Conference on Image Processing (ICIP), Atlanta, USA.

Setton,E.;Noh,J.;& Girod,B.,"Low-Latency Video Streaming Over Peer-To-Peer Networks,"Jul. 2006, Toronto, Canada.

Non-Final Office Action for U.S. Appl No. 11/933,730 dated Aug. 2, 2010.

The ns Manual (formerly ns Notes and Documentation), The VINT Project, [online],[retrieved on Jun. 2, 2006], Retrieved from the Internet <URL:http://www.isi.edu/nsnam/ns/>.

Hamid, Nadeem Abdul,"A Lightweight Framework For Peer-To-Peer Programming," May 2007, pp. 98-104, Journal of Computing Science in Colleges, vol. 22, No. 5.

Zegura, Ellen, Calvert, Kenneth, and Bhattacharjee, Samrat,"How to Model an Internetwork", 1996, IEEE INFOCOM.

Notice of Allowance for U.S. Appl. No. 11/933,730 mailed Feb. 28, 2011.

Non-Final Office action for U.S. Appl. No. 11/933,723 dated Aug. 2, 2010.

\* cited by examiner

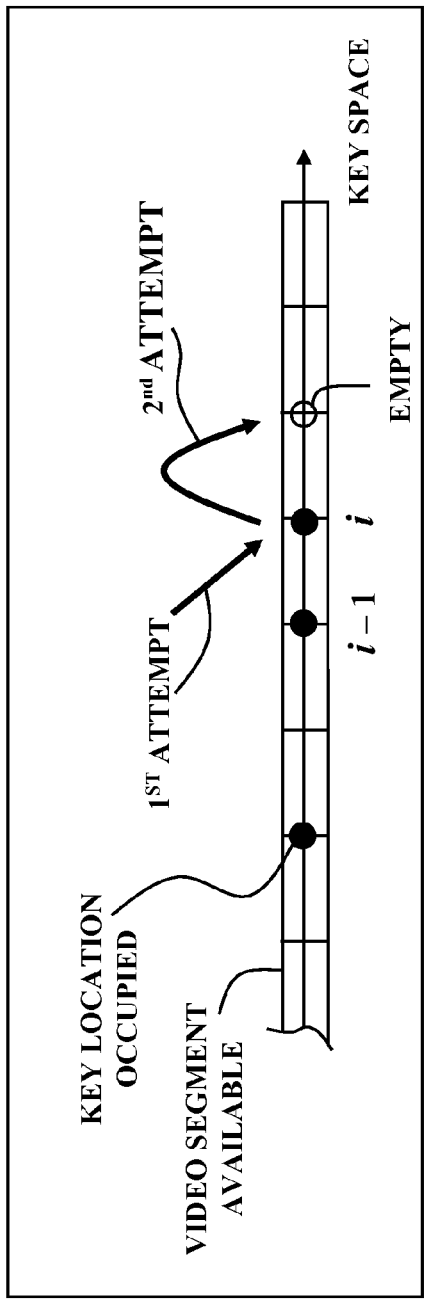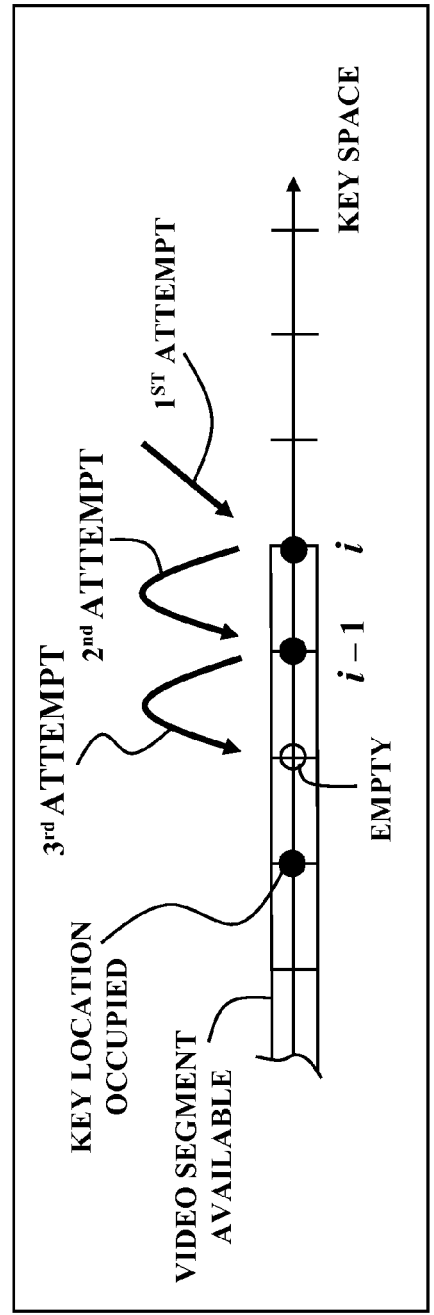

DISTRIBUTED SEARCH METHODS FOR TIME-SHIFTED AND LIVE PEER-TO-PEER VIDEO STREAMING

CROSS-REFERENCE TO RELATED APPLICATIONS

This application is related to patent application Ser. No. 11/933,730, filed Nov. 1, 2007.

FIELD OF ENDEAVOR

The invention, in its several embodiments, is related in general to multi-computer data transferring and is particularly related to computer-to-computer data streaming by providing distributed search methods for live and time-shifted streaming via distributed caching in peer-to-peer systems.

BACKGROUND

Video on demand (VoD) streaming systems allow users to receive and watch video content over a network. The state of the art presently includes the peer-to-peer media streaming systems that support only live-streaming. In P2Cast, the system requires a server that can keep track of the overlay structure consisting of peers. The P2Cast server handles every new peer that joins and rejoins after peer disconnection. Requiring a central server to support peer joining and rejoining can restrict the system scalability and as the critical node the central server becomes the single point of failure. In oStream, an overlay construction algorithm requires each peer to have full knowledge of all participating peers regarding system join time, video positions, buffer sizes, and the like. This requirement for contemporaneous common complete nodal knowledge drives a geometrically growing need for throughput in communications. That is, the contemporaneous common complete nodal knowledge requirement may impose high communication overhead among peers to achieve sufficient and timely information exchange especially in scenarios where peers frequently join and leave the system.

SUMMARY

An exemplary method embodiment of the present invention for registering cached media includes the step of hashing a media index of cached media to yield a key and then, for less than a defined number of attempts, the step of attempting and insertion of registration information associated with the key into a hash table overlay based on the key. The method may further include testing as to whether the adjusted key is above a maximum media block index, and if so, then inserting the registration information into the hash table overlay based on the maximum block index. The method may further include testing as to whether the adjusted key is less than zero, and if so, then inserting the registration information into the hash table overlay based on a zero index.

Another exemplary method embodiment of the present invention for requesting cached media includes a repeatable step, albeit for a defined number of times, where the step is one of requesting the registration information of a peer associated with the key in a distributed hash table overlay and testing as to whether the requested registration information was received, and if not, adjusting the key by an offset. There may also be testing as to whether the adjusted key is less than zero, and if so, then a step of requesting cached media from a server, e.g., a video server, based on the media index may be executed. If the penultimate try at requesting the registration information is unsuccessful, then a step of requesting cached media is made of a from a server, e.g., a video server, based on the key.

An additional exemplary method embodiment, include the step of requesting cached media from a peer associated with received registration information and, testing whether the requested cached media is not received prior to a time threshold, and if not, then prompting a node to ping the peer associated with received registration information. The exemplary method may further include testing whether a response to the ping is received prior to a second time threshold, and if not, then deleting registration information associated with the peer from the distributed hash table overlay. The exemplary method may be applied separately or in conjunction with other method embodiments.

An exemplary apparatus embodiment of the present invention includes addressable memory, e.g., a playback buffer and a distributed stream cache and a processing subsystem in communication with the addressable memory where the processing subsystem, whether through circuitry, the execution of machine-readable code, or combinations of both, is configured to: (a) hash a media index of the cached media to yield a key; and while an attempt count is less than a threshold: and (b) transmit, e.g., via a port and a packet transmission network, the key for insertion into the hash table overlay registration information associated with the key. The processing subsystem may also be further configured to: (a) increment the attempt count and adjust the key by an offset if the transmission is not inserted; (b) transmit for insertion into the hash table overlay the registration information based on the maximum block index if the adjusted key is above a maximum media block index; and (c) transmit for insertion into the hash table overlay the registration information if the adjusted key is less than zero. In addition, the processing subsystem may be further configured to: (a) request the registration information of a peer associated with a second key in a hash table overlay. The processing subsystem may also be further configured to: (a) increment the request count and adjust the second key by an offset, if no registration information received; (b) request, e.g., via a port and a packet transmission network, cached media from a server based on a media index, if the adjusted second key is less than zero; and (c) request cached media from a server based on the key if an attempt count is equal to the threshold.

An exemplary system embodiment of the present invention may include: (a) a first processing node that has: (i) addressable memory comprising a playback buffer and a distributed stream cache; and (ii) a processing subsystem in communication with the addressable memory and configured to: (A) hash a media index of the cached media to yield a key; and while an attempt count is less than a threshold: (B) transmit, for insertion into a hash table overlay, registration information associated with the key; and (b) a second processing node, in communication with the first processing node via a packet transmission network, the second processing node having: (i) addressable memory; and (ii) a processing subsystem in communication with the addressable memory and configured to manage the hash table overlay. The processing subsystem of the first node may be further configured to: (A) increment the attempt count and adjust the key by an offset if the transmission is not inserted; (B) transmit for insertion into the hash table overlay the registration information based on the maximum block index if the adjusted key is above a maximum media block index; and (C) transmit for insertion into the hash table overlay the registration information if the adjusted key is less than zero. The processing subsystem of the first node may be further configured to request the registration information of a peer identified as associated with a second key in a hash table overly. The processing subsystem of the first node may further configured to: (A) increment the request count and adjust the second key by an offset, if no registration information was received; (B) request cached media from a server based on a media index, if the adjusted second key is less than zero; and (C) request cached media from a server based on the key if an attempt count is equal to the threshold. In addition, the processing subsystem of the first node may be further configured to: prompt at least one of the second processing node and a third processing node to ping the identified peer, if the requested cached media is not received prior to a time threshold; and the second processing node and/or a third processing node may have a processing subsystem this is configured to delete registration information associated with the identified peer from the distributed hash table overlay.

BRIEF DESCRIPTION OF THE DRAWINGS

The present invention is illustrated by way of example and not limitation in the figures of the accompanying drawings, and in which:

FIG. 4A is a depiction of an exemplary forward successive Distributed Hash Table (DHT) insertion method;

FIG. 4B is a depiction of an exemplary backward successive DHT insertion method;

DETAILED DESCRIPTION

Figure 1:
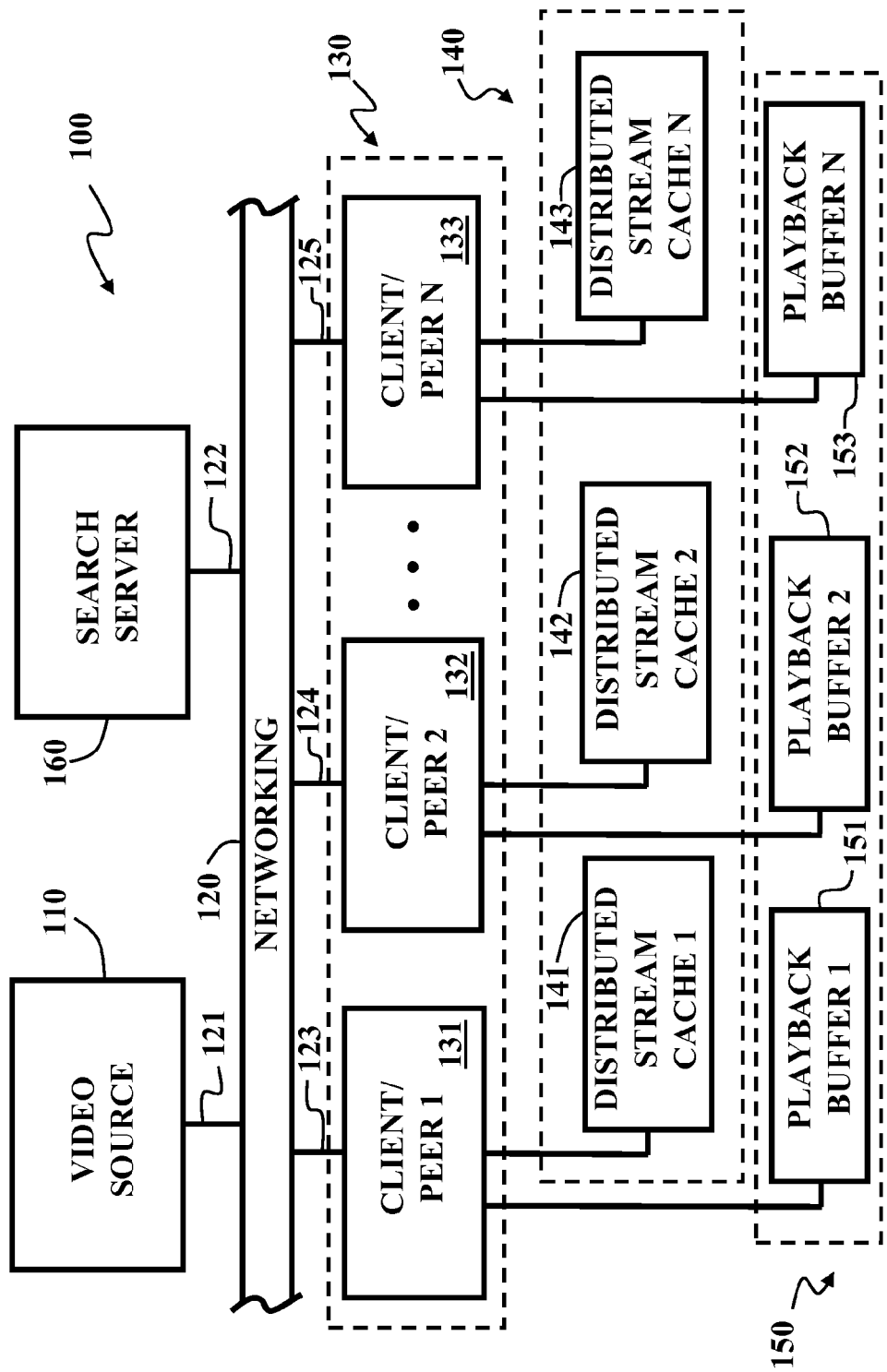
FIG. 1 is a functional block diagram of an exemplary system embodiment of the invention.

FIG. 1 is an exemplary system 100 functional block diagram of an embodiment of the invention that may be termed a peer-to-peer, time-shifted video streaming system or P2TSS. A video source 110 is shown connected via a network link 121 to a packet transmission network 120. Also shown connected to the packet transmission network 120 is a plurality of processing nodes 130 that may function as clients according to the client-server model and may function as peers in a peer-to-peer sharing of video content stored of a distributed stream cache 140, or DSC, of each processing node as disclosed herein. In some embodiments, the video source 110 may be a device that originates a live, or real time, transmission of video packets over the packet transmission network. In other embodiments, the function of the video source 110 may be performed by one or more of the processing nodes 130. In processing received video packets for viewing, each processing node may have a playback buffer 150. For example, a first client or peer 131 may be connected to the network 120 via a network link 123 and thereby may receive video packets from a video source 110 for processing and display to a user. The received packets may be buffered in a playback buffer 151 and video packets from either the playback buffer 151 or directly from the video source 110 may be stored in a distributed stream cache 141. A processing node 131 registers the availability of the content of its distributed stream cache 141 with a search server 160 which may be connected to the network via a network link 122. If a second processing node 132 joins the network 120 via a network link 124 at a time after the first processing node 131 has joined, the second processor may fill its playback buffer 152 with either the live stream from the video source 110 or may be directed by the search server 160 to fill its playback buffer 152 with the contents of the one or more distributed stream caches, such as the first processing node distributed stream cache 141. The quantities of video packets or blocks of video frame may include time delimiters that enable switching, for example, on directions from the search server 160, between the contributing processing nodes and the video source so that the second processing node 132 receives as much of the video stream as a user may indicate with as much continuity as the cached resource allows. For example, when a processing node 133 joins the network 120 via network link 125 later in time than both the first processing node 131 and the second processing node 132, the search server 160 may first direct the third, or later, processing node 133 to draw video packets first from the first processing node distributed stream cache 141 and, based on registered delimiters for the video packet time spans of both the first and second distributed caches 141, 142, may direct the third processing unit 133 to draw from the second processing node distributed stream cache 142 to fill its playback buffer 153 even before the contents of the first distributed stream cache 141 have been buffered by the third processing node 133. Accordingly, the third processing distributed stream cache 143 may be filled according to both the user indicated video delimiters and the caching policy.

Distributed Search Algorithm

The invention, in its several embodiments, may be described as methods of distributed search based on a Distributed Hash Table (DHT) and devices that effect such searches. Distributed lookup protocols may be applied to provide a robust distributed service to locate a node in the network. For instance, given a key, an exemplary lookup protocol may provide a node mapped onto the key. For example, peers may form a lookup overlay. The overlay may be a virtual ring structure that comprises the nodes. When a peer arrives, i.e., initiates joining the peer-to-peer network, it may select a random number between 0 and $2^m-1$ as a node identifier or ID. Collisions may occur where two processing nodes, seeking to become peers simultaneously seek to join the overlay using the same node identifier. Although m can be any positive integer, a value such as 160 may be chosen in order to keep the collision of node IDs very low. Identifiers of a number of processing nodes in the network may be stored locally by a peer in what may be termed a finger table. As part of interfacing with the overlay, the new peer follows the necessary steps to build its finger table and successor list (e.g., a list of successor pointer). A key also ranges from 0 to $2^m-1$. When a lookup of the key is requested, the lookup overlay that runs the exemplary lookup protocol returns a node that is closest to the key.

A DHT provides services such as key/data pair insertion, lookup and deletion in a distributed fashion which includes services that a conventional hash table provides for storing and retrieving data. Since peers join and leave anytime, the underlying lookup overlay may not be robust or provide wrong replies to queries. In order to enhance DHT service robustness, key/data pair replication may be applied. For example, by the replication of the key/data pair among k adjacent peers, no key/data pair is lost unless all k peers leave the system concurrently. Accordingly, the lookup overlay may be applied to implement a DHT. That is, the DHT service may be provided by the distributed lookup overlay, which lies on top of peers and may be termed a DHT overlay.

Application of DHT

In a P2TSS, a DHT overlay may be applied to find a peer in a distributed fashion. For example, peers may register their Distributed Stream Cache information to the DHT overlay and the information may be retrieved later by other peers looking for a particular video segment. As a key, the ID of the first video block in DSC of a peer may be used. Data, or a value, may be associated with the key and such data may include the network address of the peer corresponding to the key. A key/data pair then may be an input for DHT insertion and a key may be an input for DHT lookup. Since the data in the key/data pair in this example acts as a pointer to the peer that actually holds video segments, the DHT overlay may be independent of the data distribution overlay that is used for video data delivery. In addition, not all peers need to participate to form the lookup overlay. For example a super-peer structure for a peer-to-peer protocol may be used where peers with higher-speed network access form, as super-peers, the lookup overlay and where the remainder of the peers may consult the super-peers as to data insertion and lookup. Accordingly, while not all peers need participate in building the lookup overlay. For purposes of simplified exposition, one may presume that all peers participate in building the lookup overlay.

DSC Registration

Figure 2:
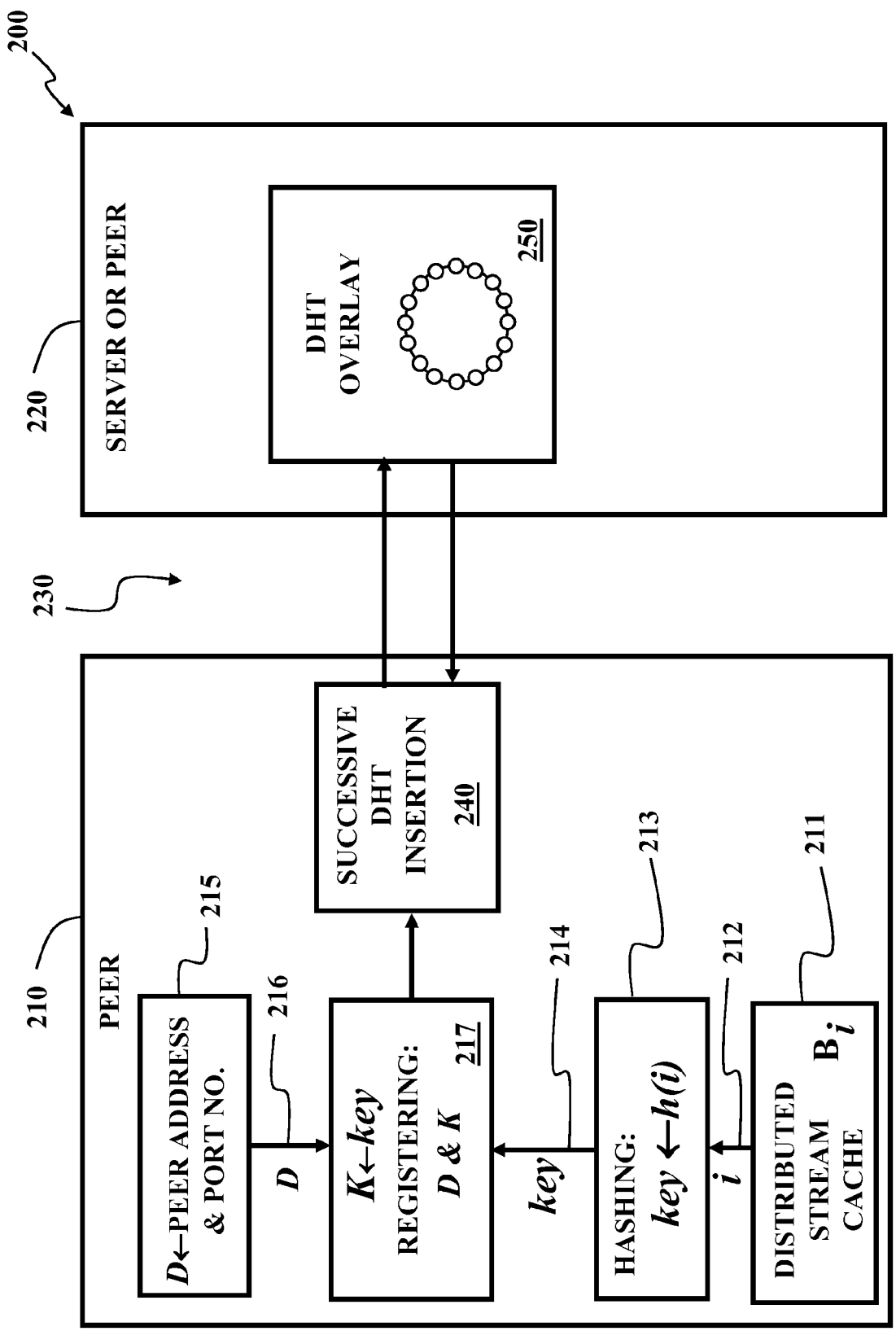
FIG. 2 is a functional block diagram of an exemplary system embodiment of the invention.

Referring to FIG. 2, an exemplary system 200 may comprise a processing node 210 in communication, via a packet transmission network 230, with a second processing node 220 that may be a server or peer that is registered in the DHT overlay 250. Peers of the exemplary peer-to-peer network store a portion of the media stream at their DSC 211 and make their DSC 211 available to other peers after first registering their DSC. The peer in this exemplary system has a video block, B, stored at its distributed stream cache 211 where the time delimitation may be expressed by a block ID such as i. The peer may have in its DSC additional contiguous blocks starting from video block B. The peer 210 may also have identification data 216, D, such as an address, e.g. and IP address, and a port number 215. For the peer 210 to register its cached media and particularly its video block, $B_i$, with the network, the peer 210 must insert a key/data pair into the DHT overlay. In order to insert a key/data pair, a key is generated for its corresponding video block. The key 214 of the video block $B_i$ is obtained by hashing 213 the block ID, i 212. An exemplary hash base function may be SHA-1. As the peer 210, P, joins the system and starts to fill its DSC 211, the first video block becomes available at its DSC 211, P 210 registers itself to the overlay 250 by defining the key/data pairing 217 performing successive attempts of DHT insertion 240 of (K, D) where K is the key produced by h(i), where h(·) is the SHA-1 function and i is the ID of the first video block and D is P's network address and port number.

One of the reasons to choose the block ID as an input to a hash function is because it is difficult to spread out keys over the virtual ring space without knowing the length of the media stream. So that, if the source of the media is a live program, the length of the program may not be known before the program starts. Another reason for choosing the block ID as an input to the hash function is that because the contiguous keys can be spread out over the ring space by the hash function, the probability that a node holds contiguous keys is very low. This unlikelihood of contiguous keys improves the performance of DHT operations against a node failure or departure.

When multiple peers attempt to put the same key to the DHT overlay, a collision occurs. This collision may be resolved by attempting the DHT insertion successively until a key is available. This process may be termed a "Successive DHT insertion" method when the algorithm is embodied as machine-readable code and executed via one or more computing nodes.

Successive DHT Insertion Method Pseudo-Code may be expressed as follows:

--- nAttempt ← 0
if DHT.Insert(key) fails then
    key = key + offset
    increase nAttempt by 1
    if key < 0 then
        DHT.ForcedInsert(0)

else if $key > \lceil \frac{T}{Q} \rceil$ then

DHT.ForcedInsert$\left(\lceil \frac{T}{Q} \rceil\right)$ else if nAttempt = Thres then
        DHT.ForcedInsert(key)
    end if
    else
    DHT.Insert(key)
    end if

---

Figure 3:
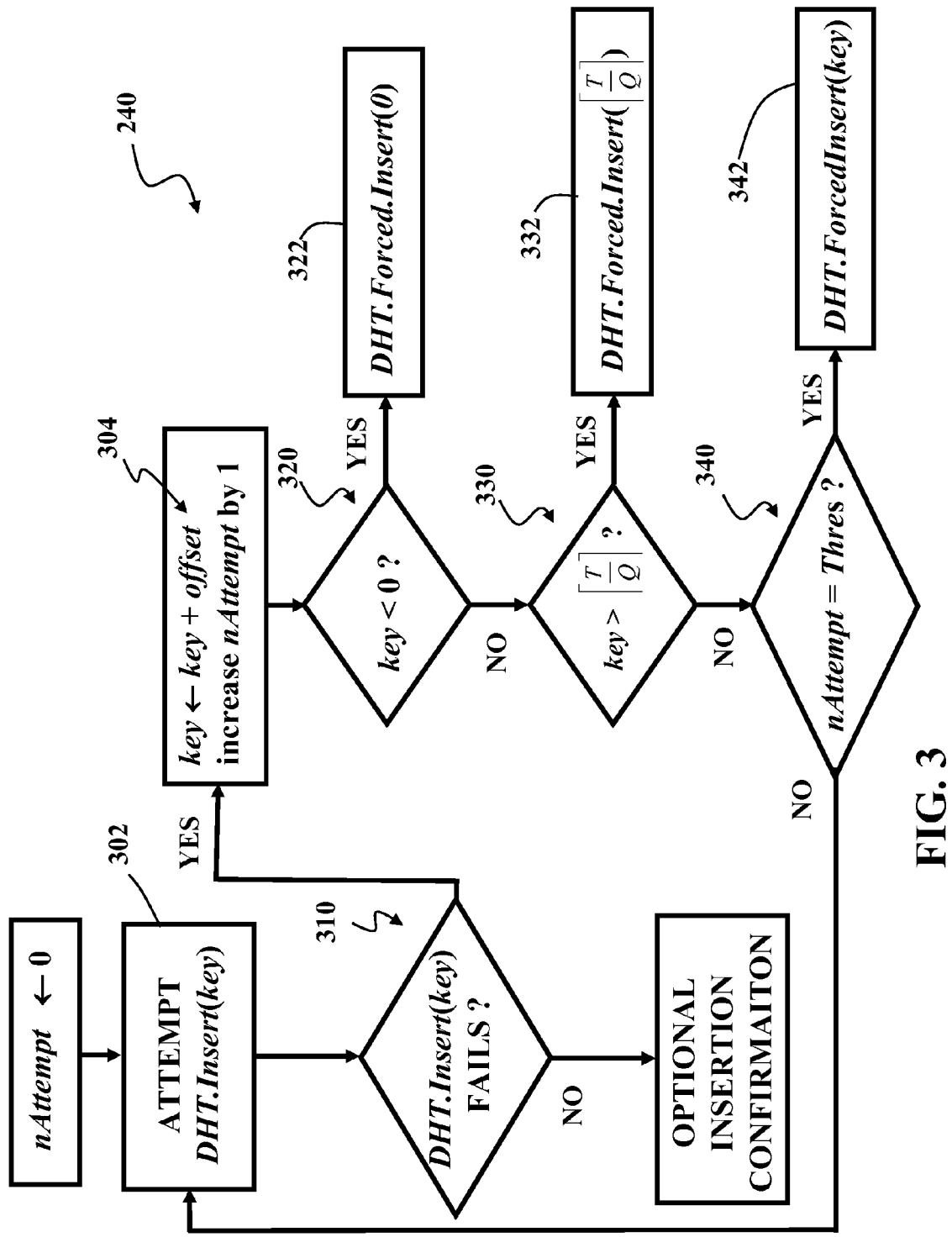
FIG. 3 is a flowchart of an exemplary method embodiment of the present invention.

The pseudo-code for the successive DHT insertion method 240 (FIG. 2) may be expressed via a flowchart such as FIG. 3 where the exemplary set of steps may be executed by one or more processing nodes for successive DHT insertion where key represents the hashed video sequence ID. A peer that has joined the network and presently has media content stored in a cache, e.g., the DSC, to be registered with the DHT overlay may attempt to insert 302 a key into the DHT overlay. The offset value 304 may be added to the key when a presumed collision 310 occurs, as noted from the failure of DHT.Insert (key) then may be signaled to the peer attempting the key insertion as node already occupied. The offset may be of any integer value and the positive offset values may be used to create the insert attempt in a forward direction along the key space. Negative offset values may be used to create successive insert attempts in a backward direction along the key space. In other words, the corresponding key is allowed to have multiple values. If the adjusted key falls below zero 320 or above the live stream position 330, e.g., above $\left\lceil \frac{T}{Q} \right\rceil$.

the peer may call for DHT.ForcedInsert(·) to insert the key forcefully, i.e., with direct effect and without regard for current occupancy of the nodal position, into the respective nodal position 322, 332 in the DHT overlay. In addition, when the number of attempts reaches a threshold value 340. Thres, the peer calls the DHT.ForcedInsert(key) 342 to insert the key forcefully into the respective nodal position in the DHT overlay corresponding to the adjusted key at that iteration.

FIGS. 4A and 4B together depict the two successive DHT insertions where forward successive insertion as depicted in FIG. 4A and backward successive insertion as depicted in FIG. 4B. In FIG. 4A, the DSC registration is successful at the second attempt of the DHT insertion. In FIG. 4B, the registration is successful at the third attempt.

DSC Retrieval

Figure 5:
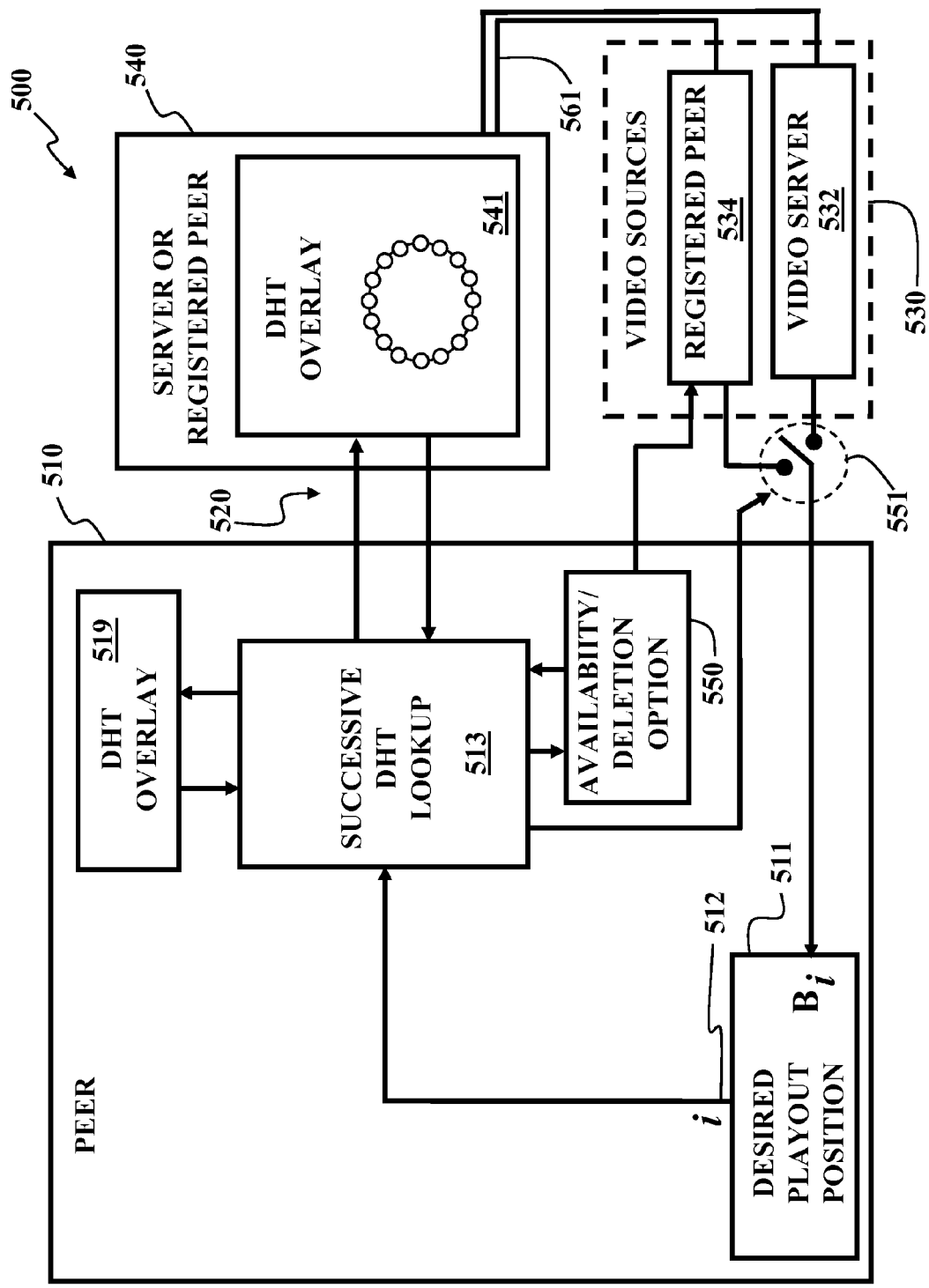
FIG. 5 is a functional block diagram of an exemplary system embodiment of the invention.

FIG. 5 is a functional block diagram of an exemplary system 500 where a first peer 510, of the network seeks, via a packet transmission network 520, to retrieve media that may be available at a video source 530, such as a video server 532 or a second peer 534 having its cached media already registered in the DHT overlay. Accordingly, DSC information retrieval is performed when a peer searches for a particular video segment. The DSC Retrieval may comprise successive DHT lookups. For expository purposes, one may presume a peer is seeking or requesting a video segment $B_i$ 511. In doing so, the peer 510 may first lookup the key i 512 of the DHT overlay 519 which may be present in whole or in part at the peer 510 or the DHT overlay 541 may be accessed in whole or in part at a server or registered peer 540 via the packet transmission network 520. If the attempt to lookup key i, rather than returning key i instead, returns no value, the seeking or requesting peer 510 may interpret this return of no value as meaning that no peer of the present network holds $B_i$ as the first block of their DSC. By executing a backward successive lookup method, the peer 510 makes successive lookup attempts 513 until the seeking or requesting peer finds a peer. Once a peer is found with key i-k, the peer may then initiate the reception of the sought data at its play-out position $B_i$, assuming the DSC size D of the requesting peer is larger than the quantity of blocks of data requested, kQ. If one presumes that the DSC returned from the lookup should cover the peer's play-out position, then an analogous forward successive lookup may not be a satisfactory method. But, an analogous forward successive method may be applied if a requesting peer finds no supplier peer 534, 540 with key i-k and a video server 532 is unavailable.

Successive DHT Lookup Method Pseudo-Code may be expressed as follows:

```
nAttempt ← 0
keyinitial ← key
if DHT.Lookup(key) fails then
    key = key - offset
    increase nAttempt by 1
    if key < 0 then
        Connect to the server to get B_0.
    else if nAttempt = Thres then
        Connect to the server to get B_key.
    end if
end if
```

Figure 6:
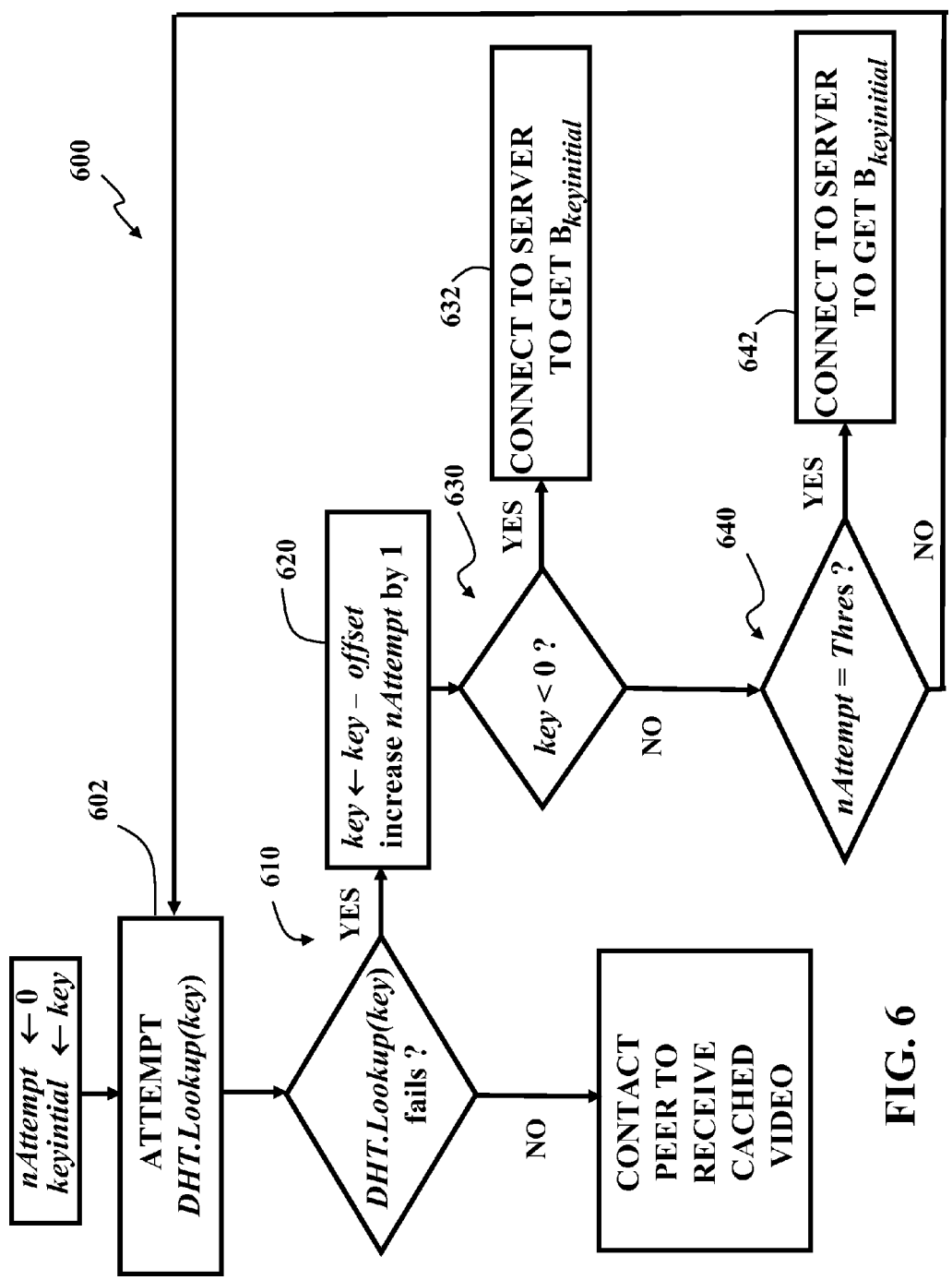
FIG. 6 is a flowchart of an exemplary backward successive DHT lookup.
Figure 7:
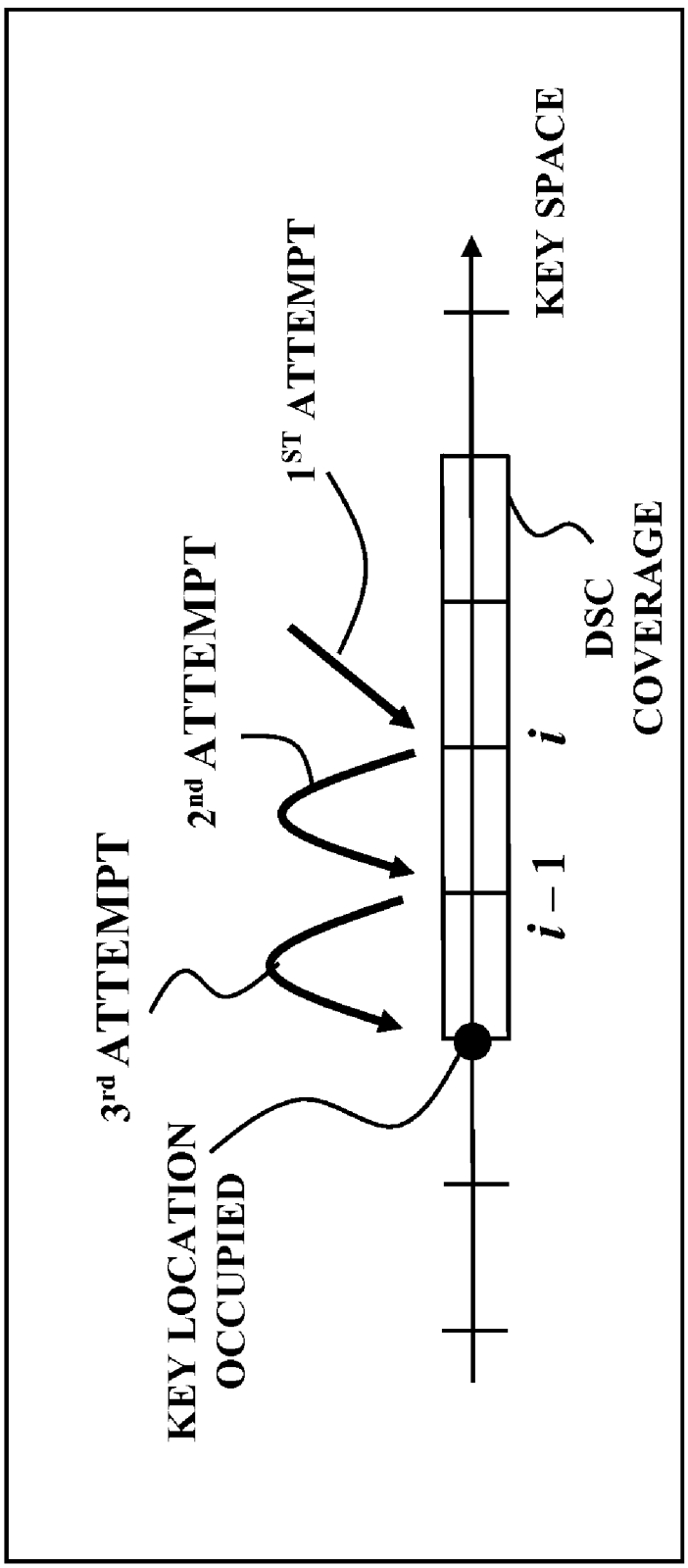
FIG. 7 is a depiction of an exemplary backward successive DHT lookup method.

FIG. 6 is a flowchart 600 that depicts the backward successive DHT lookup method. The requesting peer attempts an index DHT overlay lookup 602 where a portion, or all, of the DHT overlay of interest may be at the requesting node, or at another peer or server of the system. If the requesting peer receives a failure flag, a timeout, or otherwise determines 610, that the DHT overlay is not responding with information pertaining to a node having an index value corresponding to the first in time block of video stream the requesting peer is seeking, the index key may be decremented 620 and a lookup is made again of the DHT overlay with the adjusted key. If the adjusted key is less than zero 630, then rather than attempting to lookup a peer having the corresponding cached video block, the requesting peer is connected to a video server 632 to receive video block $B_{keyinitial}$. If the incremented attempt count has reached a threshold 640, then rather than attempting to take more time to try again to lookup a peer having the corresponding cached video block, the requesting peer is connected to a video server 642 to receive video block $B_{keyinitial}$. FIG. 7 is a graphical depiction of an exemplary backward successive DHT lookup method where in this example the offset is set to an integer value of one. The offset in this exemplary method, by decrementing negatively, causes the location indicator to decrement. FIG. 7 shows a key location occupied on a third attempt that satisfied the request that initiated the DHT lookup.

Peer Dynamics and DSC Deletion

Peers may join and leave the system at anytime. Because the joining time and exiting time may vary from peer to peer, the information returned by the DHT overlay may not correctly reflect the system status at a particular time. The DHT overlay may employ its own recovery mechanism 550 under such peer dynamics. For example, referring back to FIG. 5, while the DHT overlay is recovering from its transient state, peers may receive incorrect responses. For example, a first peer 510, $P_1$, may receive a DSC retrieval response that contains the address of a second peer 534, $P_2$, however $P_2$ has already left the system by the time $P_1$ received the DSC retrieval. When $P_1$ contacts $P_2$ to get video and if $P_1$ receives no response from $P_2$ before the expiration of a response timer started by the request by $P_1$ to receive video, then $P_1$ performs another DSC retrieval or $P_1$ may connect to a video source server 532 as illustrated symbolically by a switch 551. In the meantime, $P_1$ reports no availability of $P_2$. The report by $P_1$ of no availability of $P_2$ may initiate a DSC deletion operation. For example, $P_1$ may send DHT.delete(key, Addr($P_2$)). This message is received by the node $P_3$, which could represent a third peer 540, on the DHT overlay 519, 541 that holds the corresponding (key; Addr($P_2$)). Before deleting the key/value pair, $P_3$ confirms that $P_2$ is not available by sending a hello message 561 to $P_2$. If there is no response within a certain amount of time, $P_3$ discards the key/value pair pertaining to $P_2$. Additional security mechanisms may be used to allow only authorized deletions to prevent service attacks.

Distributed Search Methods and Models

Performance models of the distributed search algorithm for peers in a network where the peers practice in this exemplary model a live stream caching policy where a peer, P joining the system caches the most recent portion of the stream regardless of its choice of the starting position of the video. Also for this exemplary model, the backward back-off method is applied for both the DSC registration and video retrieval from a DSC.

DSC Registration

As part of the DSC registration, the DHT insertion may be attempted until an empty spot is found and the insertion takes place. The time elapsed in the repeated unsuccessful attempts at registration preceding a successful registration may directly affect the delay of the DSC registration and add to the overhead processing time allocated to the DHT overhead. Accordingly, an indicator of the delay and effect on the imposed overhead may be referenced to assess and optionally aid in the control of both possible symptoms of the DHT overlay. Where prospective viewers of a video stream, having a total length L, may join a network to access the media stream as a peer, one may presume peers arrive at the system according to a Poisson process having an arrival rate λ. Let i=

$$i = \left\lfloor \frac{T}{Q} \right\rfloor.$$

Where there are, for example, Np Peers, they may all arrive at the system before time L. Peers that arrive at the interval [iQ, (i+1)Q] perform a DSC registration where the DSC caches the media stream for both the playback of the peer and the filling of its DSC with $B_i$. Let $I_i$ represent the media interval [iQ, (i+1)Q]. Similarly let $A_i$ represent the number of peer arrivals in the media interval $I_i$. The first peer that arrives in $I_i$ sees no collision. If the second peer arrives in $I_i$, it collides with the first peer. By the backward back-off, it attempts the key of $B_{i-1}$ (where the offset in this example is presume presumed to be one). The attempt is successful only when $A_{i-1}=0$. If $A_{i-1}$ is not zero, then the second attempt in this example also fails. In this example, successive attempts are repeated until an empty slot is found or any condition is met according to Successive DHT Insertion Method.

To assess this symptom, one may apply an independence model or a simplified dependence model. In the application of an independence model, one may presume the location of keys is independent of each other. This may neglect the effect of successive DHT insertion attempts due to collisions, but it captures the system performance with reasonable accuracy when the key space is sparse, i.e., when the load factor α of the system is relatively low. The load factor α of the system may be derived from the ratio of the number of peers and the number of possible slots on the key space. For example, α may equal $$\frac{N_P}{\frac{L}{Q}+1},$$

where the number of possible slots on the key space is given as $$\frac{L}{Q}+1$$

and the numerator (Np) is the number of DSC registration operations performed by peers, which is identical to the number of peers.

In this example, one may represent the number of collisions experienced in the course of DSC registration by C. For the independent model, the average number of collisions may be expressed via an expectation operator as E(C) where $$E(C) = \frac{1}{N_p} \sum_{i=1}^{N_p} E(C \text{ of } i^{th} \text{ insertion})$$

$$= \frac{1}{N_p} \sum_{i=1}^{N_p} \sum_{k=2}^{\infty} (k-1) Pr(I=k)$$

where $Pr(I=k) = \left(1 - \frac{i-1}{\frac{L}{Q}+1}\right)\left(\frac{i-1}{\frac{L}{Q}+1}\right)^{k-1}.$ E(C of $i^{th}$ arrival) is the average number of collisions that the $i^{th}$ key insertion takes. On $i^{th}$ insertion, i−1 keys are observed on the overlay. When a collision occurs, successive attempts are assumed in this model to be independent of previous attempts. A random variable I, the number of total DHT insertion attempts, follows a geometric distribution of parameter $$p = \frac{i-1}{\frac{L}{Q}+1}$$

where p is the probability of collision when there are i−1 keys on the overlay. The predictive model presumes the hash value of a key to be uniformly distributed over the key space.

In the second approach, we consider successive insertion attempts with some simplification. Suppose each interval is of length L/Q. Since the peer arrival is modeled as a Poisson process, $A_j$ of each non-overlapping interval $I_j$, j=1, ..., L/Q, follows Poisson distribution with parameter of λL/Q, where the peer arrival rate λ is $N_p$/L. For purposes of the present model, $A_i$=k, $A_{i-1}$=a, $A_j$=0, 0≦j≦i−2. The first peer of interval i sees no collision. On the other hand, the $i^{th}$ peer (1<l≦k) sees a+l−1 collision because "a" previous slots are occupied and additionally it has to collide with l−1 peers belonging to $I_i$. Table 1 shows the number of collisions depending on the value of $A_i$.

TABLE 1

Number of total collisions when $A_{i-1}$ = a, $A_j$ = 0, 0 ≦ j < i − 1

| Ai | Number of collisions |
|---|---|
| 0 | 0 |
| 1 | 0 |
| 2 | (a + 1) |
| 3 | (a + 1) + (a + 2) |
| 4 | (a + 1) + (a + 2) + (a + 3) |
| 5 | (a + 1) + (a + 2) + (a + 3) + (a + 4) |
| ... | ... |

Based on this observation, E(C) may be expressed as follows:

$$E(C) = \sum_{k=2}^{\infty} E(C \mid A_i = k) Pr(A_i = k)$$

$$= \sum_{k=2}^{\infty} E(C \mid A_i = k) e^{-\frac{N_p}{Q}} \frac{\left(\frac{N_p}{Q}\right)^k}{k!}$$

where

-continued $$E(C \mid A_i = k) = E(E(C \mid A_i = k, A_{i-1} = a)$$

$$\approx \sum_{a=0}^{\infty} E(C \mid A_i = k, A_{i-1} = a, U)$$

$$= \sum_{i=1}^{k-1} (a+i)$$

$$= \frac{(k-1)(a+1+a+k-1)}{2}$$

$$= \frac{(k-1)(2a+k)}{2},$$

where U is an event in which $A_{i-2}=0, \ldots, A_0=0$. This may be termed a first order solution. The solution to $E(C\backslash A_i=k)$ is an approximation since we do not take into account the cases other than $A_{i-1}=a$, $A_j=0$; $0 \leq j < i-1$. However, when the load factor $\alpha$ is small, $\Pr(A_i > 1)$ is also small and the approximation matches the simulation results reasonably. One may increase the accuracy of the solution by considering more cases. The second order solution to the problem considers non-zero values of $A_{i-2}$.

Figure 8:
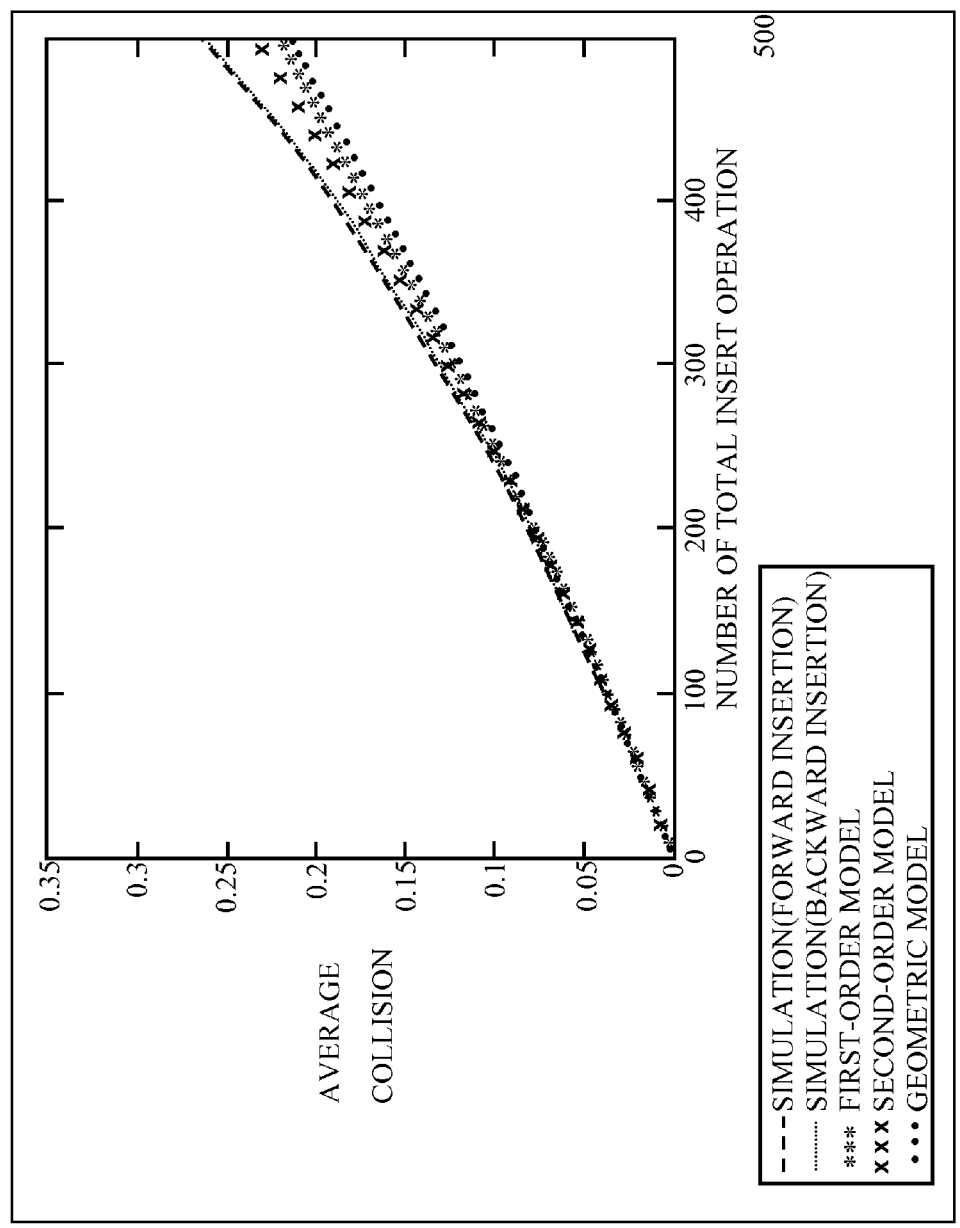
FIG. 8 is a graph depicting simulation results for the independence model where the average number of collisions is shown per DSC registration.

FIG. 8 illustrates a graph depicting simulation results for the independence model where the average number of collisions is shown per DSC registration, i.e., per number of total insertion operations (a), and simulation results. In particular, FIG. 8 shows the three models and two different simulations results. One thousand simulations were conducted to yield each point on each curve. To see the effects of the direction in successive attempts, both forward/backward DHT insertions were implemented. All the three models predict the simulation results well when $\alpha$ is small. With increased values of $\alpha$, the second-order model more closely predicts the simulation results.

DSC Retrieval

In this section, we develop a probability model for the delay pertaining to DSC retrieval, i.e., the latency of DSC retrieval. While a principal contributor to the delay in communication, or latency of the DSC retrieval may depend on the physical distance between peers and their local communication processing delays, the latency focus of the present performance pertains to the number of attempts of successive DHT lookups. Suppose $N_p$ keys are placed on the overlay and no peers join or leave during a DSC retrieval process. Then, the number of keys can be assumed to remain as $N_p$. When the offset is small, the successive DHT lookup is affected by successive DHT insertion. On the other hand, as the offset increases, the impact of successive DHT insertion decreases and eventually the correlation between two successive DHT lookups becomes weak. Let N denote the number of DHT lookups for a DSC retrieval. Assuming the offset is big enough to assume successive DHT lookups are independent, the probability that N=k is:

$$Pr(N=k)=(1-\alpha)^{k-1}\alpha,$$

where $\alpha$ is the load factor defined in the previous section.

PMF of the Number of Keys

Figure 9:
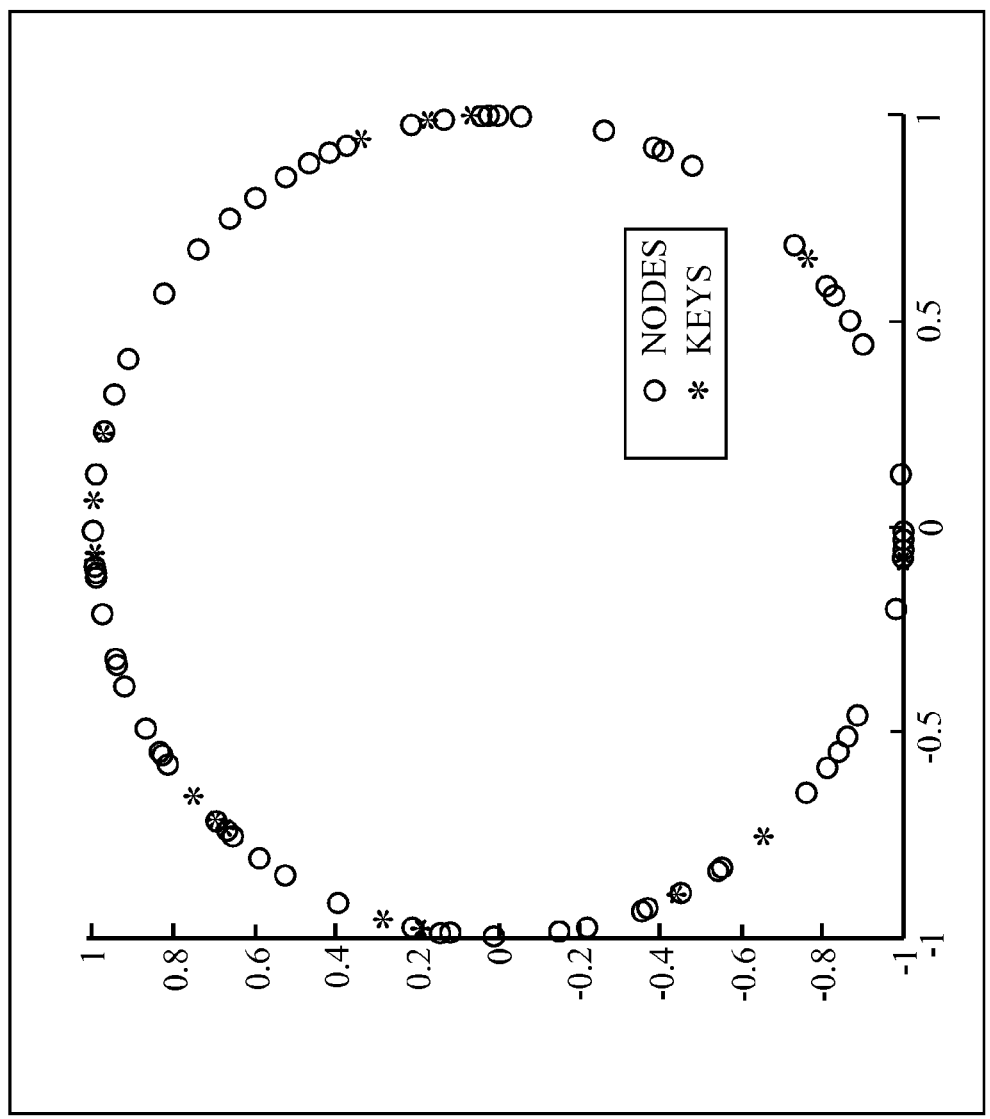
FIG. 9 is a graph depicting an example of the key/node space shown as a snapshot of the key/node space of the DHT overlay.

FIG. 9 is a graph depicting an example of the key/node space at an exemplary point in time. The key/node space snapshot shows the DHT overlay with 100 nodes and 10 keys. On the key/node space, the interval between adjacent nodes is identical to each other on average. This average similarity may result from the fact that the hashed value of the node ID is uniformly distributed over the key/node space. Suppose there are $N_p$ nodes on the key/node space. When a key is inserted, it falls into one of the intervals in the key space. Since each interval is of the same length, the probability that keys fall into a particular interval is $1/N_p$. Then, the probability that k keys fall into the interval is:

$$Pr(N=k) = \binom{N_p}{k}\left(\frac{1}{N_p}\right)^k \left(1 - \frac{1}{N_p}\right)^{N_p-k}$$

When $N_p \gg 1$, the equation approximates a Poisson distribution with parameter $$N_p * \frac{1}{N_p} = 1.$$

The PMF of N is:

$$Pr(N=k) = \frac{e^{-1}}{k!}.$$

So far, the presumed number of available key locations, $$\frac{L}{Q} + 1,$$

has been sufficiently large to not appreciably affect the model thus far. If L/Q is less than or comparable to $N_p$, the assumption of the uniformity of key distribution on the space is affected. When the system operates where $$\frac{L}{Q} + 1 \gg N_p$$

to reduce collisions, the uniformity assumption generally holds.

Experimental Results

To verify the performance of the proposed distributed search algorithm, extensible simulator for DHT algorithms was used (PlanetSim).

Overall Performance

Figure 10:
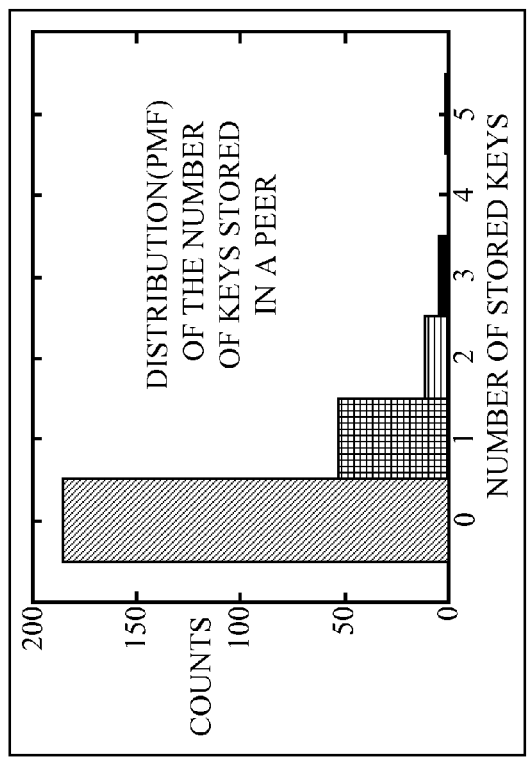
FIG. 10 is a graph depicting an exemplary prediction of a distribution of the number of stored keys.
Figure 11:
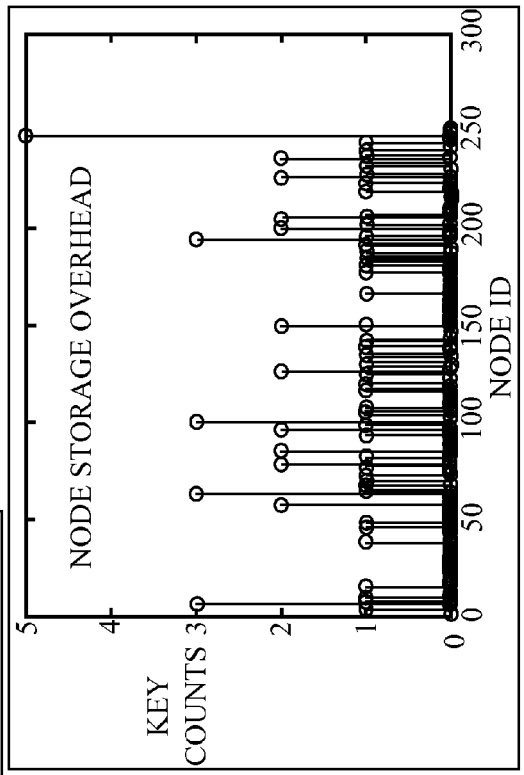
FIG. 11 is a graph depicting an exemplary slice in time of the predicted number of keys per node.
Figures 12, 13:
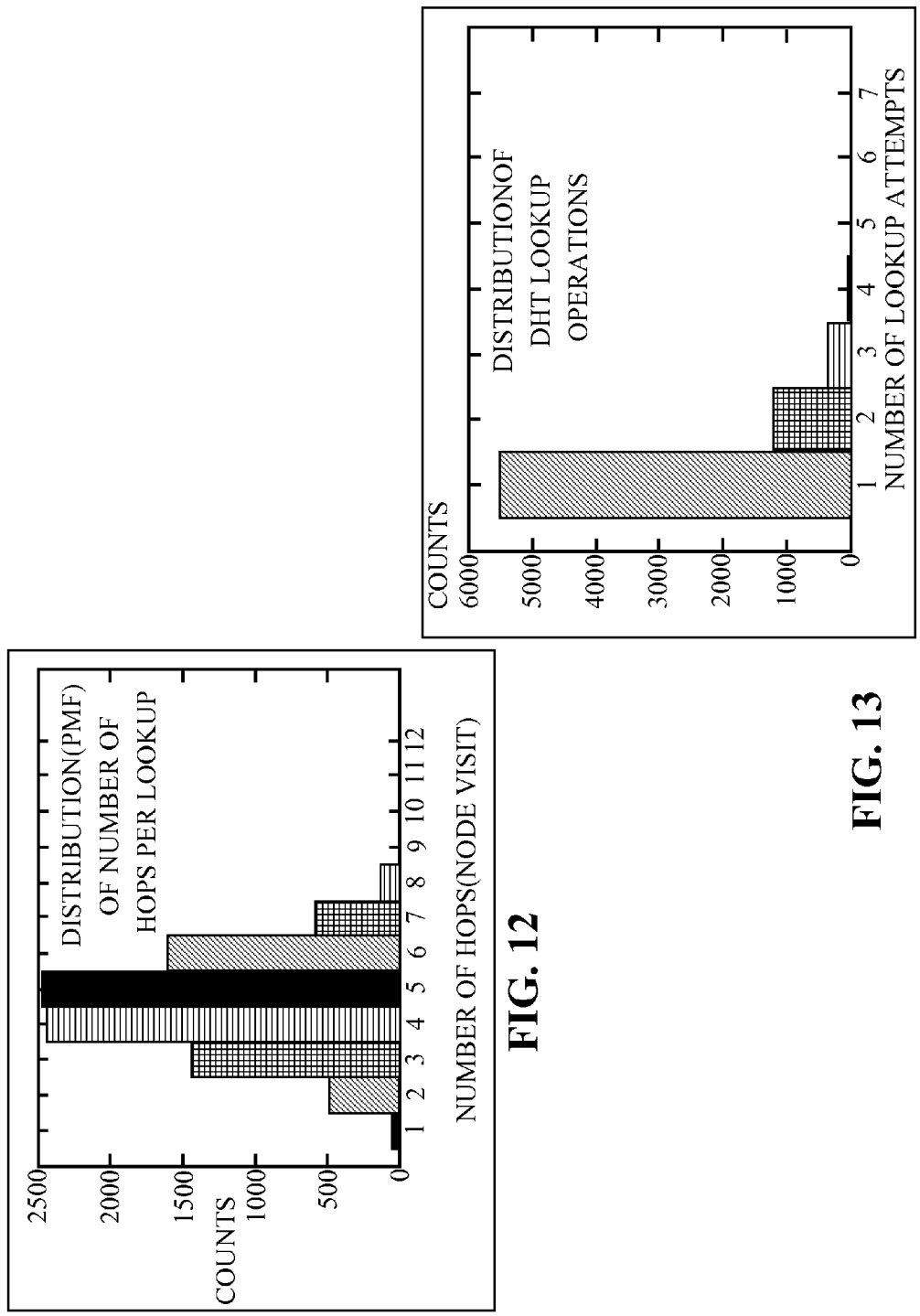
FIG. 12 is a graph depicting an exemplary predicted number of logical hops.
FIG. 13 is a graph depicting a predicted distribution of lookup attempts.

FIGS. 10-13 graphically summarize the performance of the present distributed search methods, i.e., a predicted overall performance of the exemplary Distributed Search Algorithm. FIG. 10 shows the distribution of the number of keys stored in a peer. This result matches the PMF of the number of keys of the modeled results. Keys are distributed among peers in a near-uniform fashion. FIG. 11 illustrates a snap shot of the number of keys per node. Referring to FIG. 12, the number of logical hops per DHT operation is displayed. When there are about 300 peers in the system, the maximum number of hops is close to $\log_2 300 \approx 8.23$. This result matches the predicted performance of the lookup overlay. Referring to FIG. 13, the number of DHT Lookups is presented.

Performance of DSC Retrieval

Figure 14:
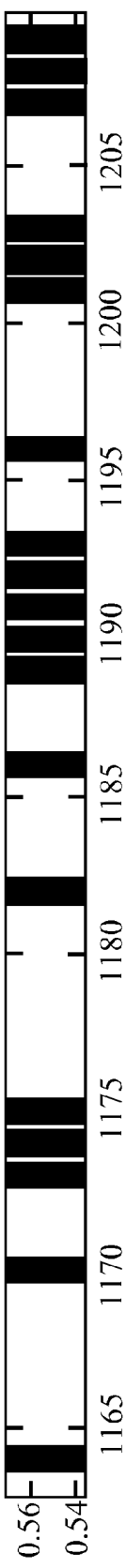
FIG. 14 is a graph depicting an exemplary DHT overlay at a certain time.
Figure 15:
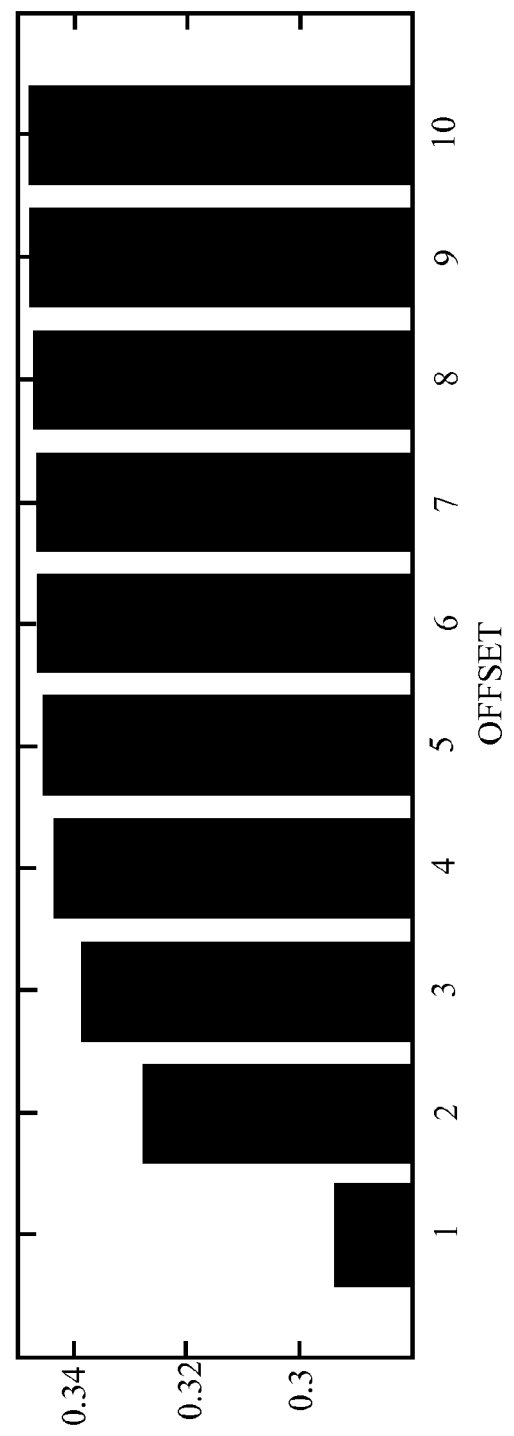
FIG. 15 is a graph depicting the correlation between two slots on the DHT overlay.

Computer-based simulations were conducted in order to predict the performance of the exemplary DHT overlay for the DSC Retrieval. In the simulations, $N_p$ is set to 500. L, an exemplary run time in seconds, remains 7200 and Q, a quantized block of time, is set to the value of five. In FIG. 14, a snapshot of the DHT overlay at a certain time is depicted. From the figure, we can observe that empty slots and key-occupied slots are contiguous in most cases. FIG. 15 shows the correlation between two slots on the DHT overlay. The horizontal axis shows the offset values. The vertical axis indicates the probability of Pr ($B_{i-1}$ is a hit|$B_i$ is a miss). $B_i$ is a miss corresponds to an event that $B_i$ slot is empty. In other words, this statistic shows that when a peer visits an empty slot on the overlay, with what probability the peer will find a non-empty slot with respect to different offsets.

From these figures, one may observe the probability increases as the offset increases. In fact, the probability converges to the load factor α, in this case it is $$\frac{N_p}{\frac{L}{Q}+1} = 0.3472.$$

Figure 16:
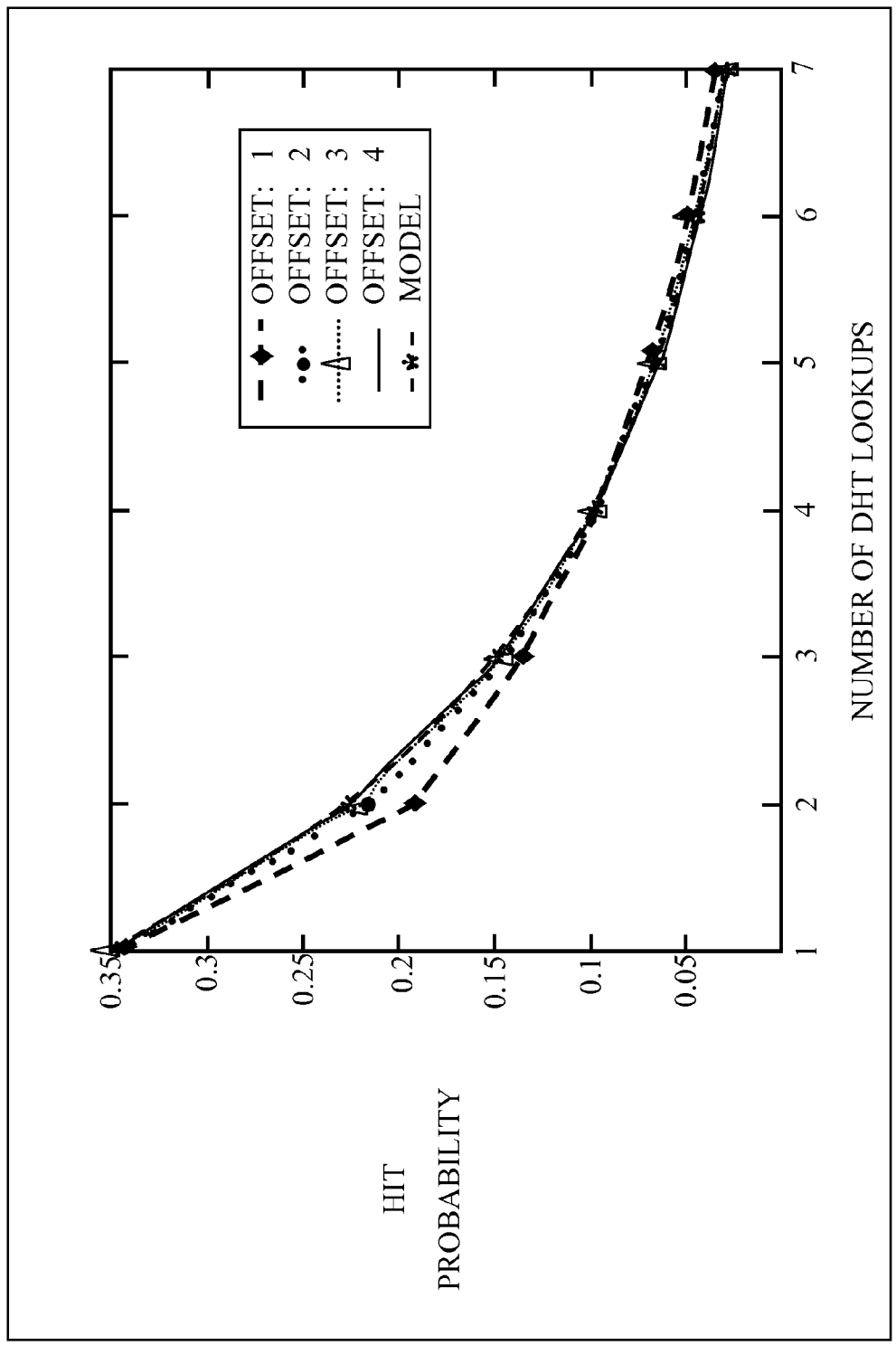
FIG. 16 is a graph depicting the number of DHT lookups per DSC retrieval.

Depicted in FIG. 16 is the number of DHT lookups per DSC retrieval, presented for four different offsets ranging from 1 to 4, as well as the prediction from the DSC retrieval model above. The hit probability distribution gets close to the model prediction when the offset increases. In addition, the overall performance of DSC retrieval improves with larger offsets. However, since the DSC size is finite, more offsets lead to shorter available DSC contents to peers who eventually find their suppliers.

One of ordinary skill in the art will also appreciate that the modules and functions described herein may be further subdivided, combined, and/or varied and yet still be in the spirit of the embodiments of the invention. In addition, while a number of variations of the invention have been shown and described in detail, other modifications, which are within the scope of this invention, will be readily apparent to those of ordinary skill in the art based upon this disclosure, e.g., the exemplary flowcharts or processes described herein may be modified and varied and yet still be in the spirit of the invention. It is also contemplated that various combinations or subcombinations of the specific features and aspects of the embodiments may be made and still fall within the scope of the invention. Accordingly, it should be understood that various features and aspects of the disclosed embodiments can be combined with or substituted for one another in order to form varying modes of the disclosed invention. Thus, it is intended that the scope of the present invention herein disclosed should not be limited by the particular disclosed embodiments described above.

What is claimed is:

1. A method of registering cached media comprising:
    hashing, by a computer processing node, a media index of the cached media to yield a key;
    while an attempt count is less than a threshold value:
        attempting insertion of registration information associated with the key into a hash table overlay based on the key;
        if the attempted insertion fails, then incrementing the attempt count and adjusting the key by an offset.

2. The method of registering cached media of claim 1 further comprising:
    if the adjusted key is above a maximum media block index, then inserting, by the computer processing node, the registration information into the hash table overlay based on the maximum block index; and
    if the adjusted key is less than zero, then inserting the registration information into the hash table overlay based on a zero index.

3. A method of requesting cached media comprising:
    testing, by a computer processor: if an attempt count is less than a threshold, then:
        requesting, b the computer r the registration information of a peer associated with the key in a distributed hash table overlay;
        if no registration information is received, by the computer processor, prior to a time threshold, then incrementing the attempt count and adjusting the key by an offset;
        if the adjusted key is less than zero, then requesting, by the computer r cached media from a server based on the media index; and
    if an attempt count is equal to the threshold, then requesting cached media from a server based on the key.

4. The method of requesting cached media of claim 3 further comprising:
    requesting, by the computer processor, cached media from a peer associated with received registration information;
    if the requested cached media is not received, by the computer processor, prior to a time threshold, then prompting a node to ping the peer associated with received registration information.

5. The method of requesting cached media of claim 4 futher comprising:
    if a response to the ping is not received prior to a second time threshold, then deleting, by the computer processor, registration information associated with the peer from the distributed hash table overlay.

6. An apparatus comprising:
    addressable memory comprising a playback buffer and a distributed stream cache; and
    a processing subsystem in communication with the addressable memory and configured to:
        hash a media index of the cached media to yield a key; and while an attempt count is less than a threshold: and
        transmit for insertion into the hash table overlay registration information associated with the key.

7. The apparatus of claim 6 wherein the processing subsystem is further configured to:
    increment the attempt count and adjust the key by an offset if the transmission is not inserted;
    transmit for insertion into the hash table overlay the registration information based on the maximum block index if the adjusted key is above a maximum media block index; and
    transmit for insertion into the hash table overlay the registration information if the adjusted key is less than zero.

8. The apparatus of claim 6 wherein the processing subsystem is further configured to:
    request the registration information of a peer associated with a second key in a hash table overlay.

9. A system comprising:
    a first processing node comprising:
        addressable memory comprising a playback buffer and a distributed stream cache; and
        a processing subsystem in communication with the addressable memory and configured to:
            hash a media index of the cached media to yield a key; and while an attempt count is less than a threshold:
            transmit, for insertion into a hash table overlay, registration information associated with the key; and
    a second processing node, in communication with the first processing node via a packet transmission network, the second processing node comprising:
        addressable memory; and a processing subsystem in communication with the addressable memory and configured to manage the hash table overlay.

10. The system of claim 9 wherein the processing subsystem of the first node is further configured to:
   increment the attempt count and adjust the key by an offset if the transmission is not inserted;
   transmit for insertion into the hash table overlay the registration information based on the maximum block index if the adjusted key is above a maximum media block index; and
   transmit for insertion into the hash table overlay the registration information if the adjusted key is less than zero.

11. The system of claim 9 wherein the processing subsystem of the first node is further configured to:
   request the registration information of a peer identified as associated with a second key in a hash table overlay.

12. The system of claim 11 wherein at least one of the second processing node and a third processing node has a processing subsystem configured to delete registration information associated with the identified peer from the distributed hash table overlay.

13. An apparatus comprising:
   addressable memory comprising a playback buffer and a distributed stream cache; and
   a processing subsystem in communication with the addressable memory and configured to:
      hash a media index of the cached media to yield a key; and while an attempt count is less than a threshold: and
      transmit for insertion into the hash table overlay registration information associated with the key.
      request the registration information of a peer associated with a second key in a hash table overlay;
      increment the request count and adjust the second key by an offset, if no registration information is received prior to a time threshold;
      request cached media from a server based on a media index, if the adjusted second key is less than zero; and
      request cached media from a server based on the key if an attempt count is equal to the threshold.

14. A system comprising:
   a first processing node comprising:
      addressable memory comprising a playback buffer and a distributed stream cache; and
      a processing subsystem in communication with the addressable memory and configured to:
         hash a media index of the cached media to yield a key; and while an attempt count is less than a threshold:
         transmit, for insertion into a hash table overlay, registration information associated with the key;
         request the registration information of a peer identified as associated with a second key in a hash table overlay;
         increment the request count and adjust the second key by an offset, if no registration information is received prior to a time threshold;
         request cached media from a server based on a media index, if the adjusted second key is less than zero; and
         request cached media from a server based on the key if an attempt count is equal to the threshold; and
   a second processing node, in communication with the first processing node via a packet transmission network, the second processing node comprising:
      addressable memory; and
      a processing subsystem in communication with the addressable memory and configured to manage the hash table overlay.

15. A system comprising:
   a first processing node comprising:
      addressable memory comprising a playback buffer and a distributed stream cache; and
      a processing subsystem in communication with the addressable memory and configured to:
         hash a media index of the cached media to yield a key; and while an attempt count is less than a threshold:
         transmit, for insertion into a hash table overlay, registration information associated with the key;
         request the registration information of a peer identified as associated with a second key in a hash table overlay; and
         prompt at least one of the second processing node and a third processing node to ping the identified peer, if the requested cached media is not received prior to a time threshold; and
   a second processing node, in communication with the first processing node via a packet transmission network, the second processing node comprising:
      addressable memory; and
      a processing subsystem in communication with the addressable memory and configured to manage the hash table overlay.

* * * * *